United States Patent
Chen et al.

(10) Patent No.: US 11,990,968 B2
(45) Date of Patent: May 21, 2024

(54) RADIO FREQUENCY MODULE AND ELECTRONIC DEVICE

(71) Applicant: GUANGDONG OPPO MOBILE TELECOMMUNICATIONS CORP., LTD., Guangdong (CN)

(72) Inventors: Feng Chen, Guangdong (CN); Lin Tong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/851,950

(22) Filed: Jun. 28, 2022

(65) Prior Publication Data

US 2022/0329299 A1    Oct. 13, 2022

Related U.S. Application Data

(63) Continuation of application No. PCT/CN2020/142140, filed on Dec. 31, 2020.

(30) Foreign Application Priority Data

Dec. 31, 2019    (CN) .......................... 201911410335.X

(51) Int. Cl.
*H04B 7/06* (2006.01)
*H04B 7/0408* (2017.01)
*H04B 7/0491* (2017.01)

(52) U.S. Cl.
CPC .......... *H04B 7/068* (2013.01); *H04B 7/0408* (2013.01); *H04B 7/0491* (2013.01)

(58) Field of Classification Search
CPC .... H04B 7/068; H04B 7/0408; H04B 7/0491; H04B 7/06; H04B 7/0613; H04B 1/005;
(Continued)

(56) References Cited

U.S. PATENT DOCUMENTS 8,559,893 B2 * 10/2013 Przadka ................. H04B 1/406
455/83
9,312,888 B2 * 4/2016 Weissman ............ H04B 7/0404
(Continued)

FOREIGN PATENT DOCUMENTS

CN    103338054 A    10/2013
CN    105306112 A    2/2016
(Continued)

OTHER PUBLICATIONS

European Search Report for European Application No. 20910769.7 dated Jan. 9, 2023 (8 pages).
(Continued)

*Primary Examiner* — James M Perez
(74) *Attorney, Agent, or Firm* — Young Basile Hanlon & MacFarlane, P.C.

(57) ABSTRACT

A RF module and an electronic device. The RF module includes a RF transceiver module; a first antenna configured to transmit a first transmission signal, and receive a first main reception signal and a second diversity reception signal; a first triplexer connected to the RF transceiver module and the first antenna, and being configured to isolate the first transmission signal, the first main reception signal, and the second diversity reception signal; a second antenna configured to transmit a second transmission signal, receive a second main reception signal and a first diversity reception signal, and a frequency band of the first transmission signal being different from that of the second transmission signal; and a second triplexer connected to the RF transceiver module and the second antenna, and being configured to isolate the second transmission signal, the second main reception signal, and the first diversity reception signal.

13 Claims, 6 Drawing Sheets

(58) Field of Classification Search
CPC .. H04B 1/0053; H04B 1/0057; H04B 1/0064; H04B 1/0067
See application file for complete search history.

(56) References Cited

U.S. PATENT DOCUMENTS

| | | | | |
|---|---|---|---|---|
| 9,722,639 | B2* | 8/2017 | Khlat | H04B 1/0064 |
| 9,843,465 | B2* | 12/2017 | Tarighat Mehrabani | H04L 27/18 |
| 9,979,575 | B2* | 5/2018 | Tarighat Mehrabani | H04W 76/27 |
| 10,505,602 | B1* | 12/2019 | Khan | H04B 7/0456 |
| 10,716,157 | B2* | 7/2020 | Belghoul | H04W 76/15 |
| 11,303,318 | B2* | 4/2022 | Chen | H04B 1/406 |
| 2006/0268811 | A1* | 11/2006 | Fukunaga | H04L 25/0278 370/343 |
| 2011/0110452 | A1* | 5/2011 | Fukamachi | H04B 1/0057 375/267 |
| 2012/0032855 | A1* | 2/2012 | Reede | G01S 13/82 370/252 |
| 2013/0163482 | A1* | 6/2013 | Suzuki | H04L 5/1461 370/278 |
| 2014/0003300 | A1* | 1/2014 | Weissman | H04B 7/0404 370/310 |
| 2014/0133364 | A1* | 5/2014 | Weissman | H04B 1/52 370/273 |
| 2015/0263405 | A1* | 9/2015 | Khlat | H03H 9/706 333/118 |
| 2016/0156490 | A1* | 6/2016 | Tarighat Mehrabani | H04B 7/0408 455/23 |
| 2016/0191107 | A1* | 6/2016 | Khlat | H04L 5/001 370/328 |
| 2017/0026061 | A1* | 1/2017 | Wloczysiak | H04B 1/0057 |
| 2017/0054485 | A1* | 2/2017 | Hwang | H04B 1/405 |
| 2017/0099608 | A1* | 4/2017 | Lam | H04B 1/16 |
| 2017/0163298 | A1* | 6/2017 | Hou | H04B 1/0057 |
| 2017/0179997 | A1* | 6/2017 | Liao | H04B 1/44 |
| 2017/0195106 | A1* | 7/2017 | Pehlke | H04B 1/38 |
| 2017/0302317 | A1* | 10/2017 | Horita | H04B 1/00 |
| 2017/0317710 | A1* | 11/2017 | Liu | H04B 1/0057 |
| 2018/0019730 | A1* | 1/2018 | Takeuchi | H03H 9/72 |
| 2018/0062892 | A1* | 3/2018 | Tarighat Mehrabani | H04L 27/18 |
| 2018/0063031 | A1* | 3/2018 | Wloczysiak | H04B 1/0064 |
| 2018/0227960 | A1* | 8/2018 | Belghoul | H04L 1/1854 |
| 2018/0294858 | A1* | 10/2018 | Pehlke | H04B 1/40 |
| 2019/0334573 | A1* | 10/2019 | Thompson | H04L 5/14 |
| 2020/0076488 | A1* | 3/2020 | Brunel | H04B 7/063 |
| 2020/0162114 | A1* | 5/2020 | King | H04B 1/0057 |
| 2021/0029698 | A1* | 1/2021 | Lim | H04W 76/15 |
| 2021/0281287 | A1* | 9/2021 | Chen | H04B 1/406 |
| 2021/0376989 | A1* | 12/2021 | Lim | H04L 5/0092 |
| 2022/0200651 | A1* | 6/2022 | Chen | H04B 1/406 |
| 2022/0329299 | A1* | 10/2022 | Chen | H04B 1/0057 |
| 2022/0345552 | A1* | 10/2022 | Wu | B32B 9/045 |
| 2022/0368357 | A1* | 11/2022 | Chen | H04B 1/0057 |
| 2022/0369405 | A1* | 11/2022 | Lim | H04B 17/336 |
| 2024/0022282 | A1* | 1/2024 | Zhang | H04B 1/0064 |

FOREIGN PATENT DOCUMENTS

| | | |
|---|---|---|
| CN | 106921405 A | 7/2017 |
| CN | 110505325 A | 11/2019 |
| CN | 111181606 A | 5/2020 |
| JP | 2015528237 A | 9/2015 |
| WO | 2018148325 A1 | 8/2018 |

OTHER PUBLICATIONS

International search report and Written Opinion with English Translation for of the International Search Authority International application No. PCT/CN2020/142140 dated Mar. 2, 2021 (15 pages).
Chinese first office action with English Translation for application No. 201911410335.X dated Mar. 18, 2021 (12 pages).
Chinese second office action with English Translation for application No. 201911410335.X dated Aug. 30, 2021 (12 pages).
Chinese rejection decision with English Translation for application No. 201911410335.X dated Jan. 25, 2022 (10 pages).
Japanese Notice of Reasons for Refusal with English Translation for Japanese Patent Application No. 2022-540592 dated Aug. 1, 2023 (10 pages).
Japanese Decision of Refusal with English Translation for JP Application 2022540592 mailed Jan. 9, 2024. (4 pages).
Srdan Mihaljevic., "ETSI & 3GPP 5G standardization toward IMT-2020 Radio spectrum and interface", ITU regional seminar, Jul. 3, 2018. (19 pages).

* cited by examiner

… (1) …

RADIO FREQUENCY MODULE AND ELECTRONIC DEVICE

CROSS-REFERENCE TO RELATED APPLICATION(S)

The present application is a continuation-application of International (PCT) Patent Application No. PCT/CN2020/142140, filed on Dec. 31, 2020, which claims foreign priority of Chinese Patent Application No. 201911410335.X, filed on Dec. 31, 2019, the entire contents of both of which are hereby incorporated by reference.

TECHNICAL FIELD

The present disclosure relates to the technical field of antennas, and in particular to a radio frequency (RF) module and an electronic device.

BACKGROUND

With development and progress of technology, 5G communication technology has gradually begun to be applied. As a result, the strap requires to be adjusted manually each time the wearable devices are worn, which is complicated to operate, and user experience may be influenced. With application of 5G communication technology, more antennas may be required for communication in electronic devices such as mobile phones or tablet computers. However, portions in the electronic devices available to be arranged an antenna are limited, which leads to a difficulty of arranging the antennas in the electronic devices.

It needs to be explained that the information disclosed in the above background art section is only used to enhance the understanding of the background of the present disclosure, and therefore may include information that does not constitute the prior art known to those of ordinary skill in the art.

SUMMARY

A purpose of the present disclosure is to provide a RF module and an electronic device, such that one or more problems resulted from defects of the related art may be solved to a certain extent.

The purpose of the present disclosure is to provide the RF module and the electronic device, so as to solve a problem of the difficulty of arranging the antennas in the electronic devices when more antennas are arranged in the electronic devices, to a certain extent.

According to a first aspect of the present disclosure, a RF module is provided and includes a RF transceiver module, configured to a transmit and receive RF signals; a first antenna, configured to transmit a first transmission signal, receive a first main reception signal, and receive a second diversity reception signal; a first triplexer, comprising a first terminal connected to the RF transceiver module, and a second terminal connected to the first antenna, wherein the first triplexer is configured to isolate the first transmission signal, the first main reception signal, and the second diversity reception signal; a second antenna, configured to transmit a second transmission signal, receive a second main reception signal, and receive a first diversity reception signal; wherein a frequency band of the first transmission signal is different from a frequency band of the second transmission signal; and a second triplexer, comprising a first terminal connected to the RF transceiver module, and a second terminal connected to the second antenna, wherein the second triplexer is configured to isolate the second transmission signal, the second main reception signal, and the first diversity reception signal.

According to a second aspect of the present disclosure, an electronic device is provided and includes the RF module described above.

Understandably, a foregoing general description above and a following detailed description are only exemplary and explanatory, which will not limit the present disclosure.

BRIEF DESCRIPTION OF DRAWINGS

The drawings herein are incorporated into the specification and constitute a part of the specification. They show embodiments conforming to the present disclosure and are used to illustrate the principle of the present disclosure in combination with the specification. Obviously, the drawings in the following description are merely some embodiments of the present disclosure. For one of ordinary skill in the art, it is also possible to obtain other drawings according to these drawings without paying any creative work.

Figure 1:
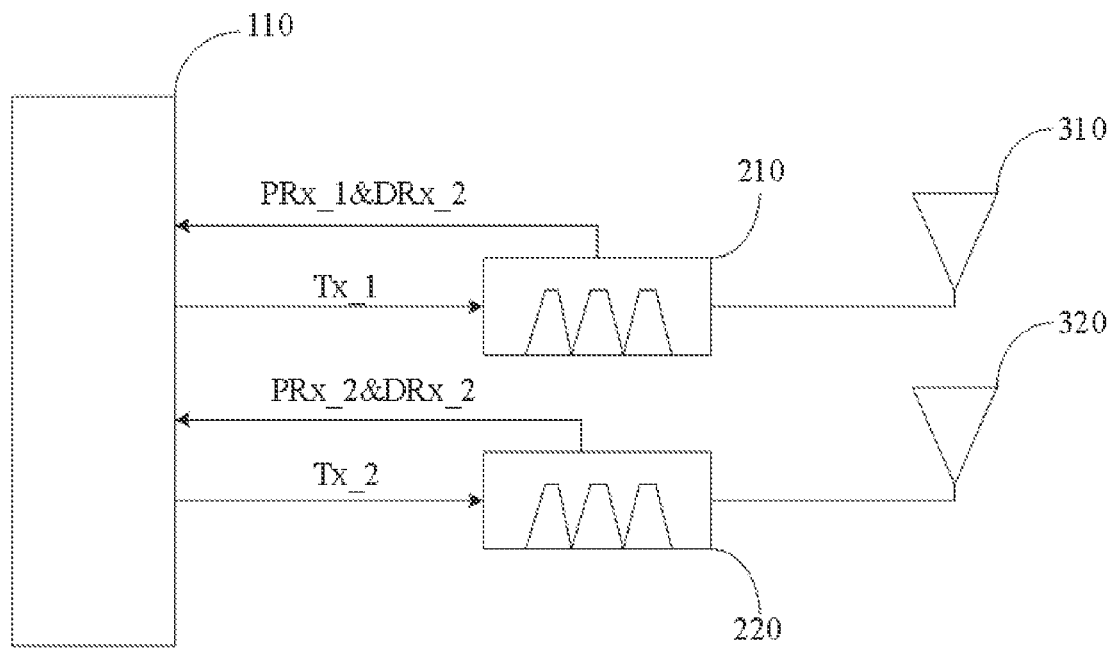
FIG. 1 is a schematic view of a first type of RF module provided by an exemplary embodiment of the present disclosure.

In the drawings: 110—RF transceiver module; 210—first triplexer; 220—second triplexer; 310—first antenna; 320—second antenna; 410—first amplifier circuit; 420—second amplifier circuit; 430—third amplifier circuit;

100—electronic device; 10—display screen; 11—display area; 12—non-display area; 20—frame; 30—motherboard; 40—battery; 50—rear cover.

DETAILED DESCRIPTION

Exemplary embodiments will now be described more comprehensively with reference to the accompanying drawings. However, the exemplary embodiments can be implemented in various forms, and should not be construed as being limited to the embodiments set forth herein; on the contrary, these embodiments are provided so that the present invention will be comprehensive and complete, and the concept of the exemplary embodiments is comprehensively conveyed to those skilled in the art. The same reference numerals in the figures represent the same or similar structures, and thus their detailed descriptions will be omitted.

In an exemplary embodiment, a RF module is first provided. The RF module may be used in the electronic devices such as the mobile phones, the tablet computers, electronic readers, smart televisions, wearable terminals, vehicular computers, and so on. As shown in FIG. 1, the RF module includes a RF transceiver module 110, a first antenna 310, a first triplexer 210, a second antenna 320, and a second triplexer 220. The RF transceiver module 110 is configured to transmit and receive RF signals. The first antenna 310 is configured to transmit a first transmission signal, receive a first main reception signal, and receive a second diversity reception signal. A first terminal of the first triplexer 210 is connected to the RF transceiver module 110, and a second terminal of the first triplexer 210 is connected to the first antenna 310. The first triplexer 210 is configured to isolate the first transmission signal, the first main reception signal, and the second diversity reception signal. The second antenna 320 is configured to transmit a second transmission signal, receive a second main reception signal, and receive a first diversity reception signal. A frequency band of the first transmission signal is different from a frequency band of the second transmission signal. A first terminal of the second triplexer 220 is connected to the RF transceiver module 110, and a second terminal of the second triplexer 220 is connected to the second antenna 320. The second triplexer 220 is configured to isolate the second transmission signal, the second main reception signal, and the first diversity reception signal.

In some embodiments, the first transmission signal is an uplink signal. The first main reception signal and the first diversity reception signal are downlink signals received based on the first transmission signal. The second transmission signal is an uplink signal. The second main reception signal and the second diversity reception signal are downlink signals received based on the second transmission signal.

According to the RF module provided in some embodiments of the present disclosure, the first antenna 310 is configured to transmit the first transmission signal, receive the first main reception signal, and receive the second diversity reception signal; and the second antenna 320 is configured to transmit the second transmission signal, receive the second main reception signal, and receive the first diversity reception signal. In this way, an occurrence of an additional antenna required to be arranged separately for receiving the first diversity reception signal and the second diversity reception signal may be reduced. The number of the antennas may be reduced, such that the problem of the difficulty of arranging the antennas in the electronic devices resulting from more antennas in the electronic devices may be solved at least to a certain extent. As a result, spaces of the electronic devices may be saved effectively. In addition, the number of RF channels may be reduced by virtue of adopting triplexers, such that a space of a motherboard may be saved.

Figure 2:
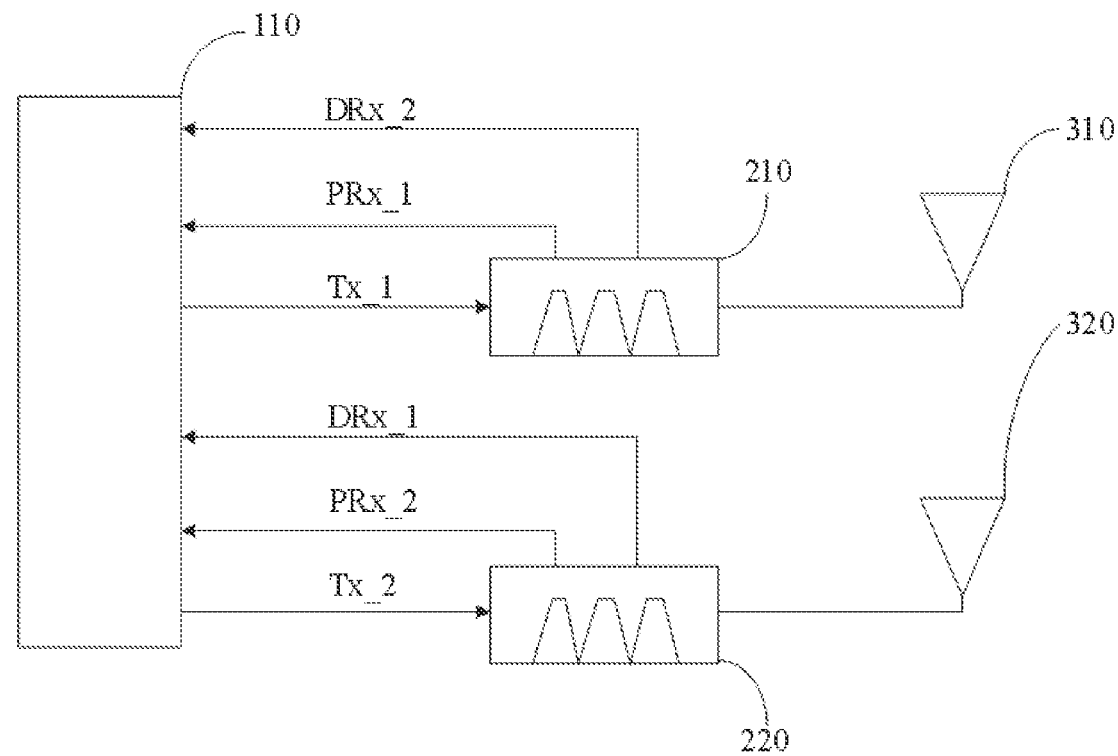
FIG. 2 is a schematic view of a second type of RF module provided by an exemplary embodiment of the present disclosure.

As shown in FIG. 2, in some embodiments, the first terminal of the first triplexer 210 includes a first sub-terminal, a second sub-terminal, and a third sub-terminal. The first sub-terminal may be connected to the RF transceiver module 110 and configured to transmit the first transmission signal. The second sub-terminal may be connected to the RF transceiver module 110 and configured to transmit the first main reception signal. The third sub-terminal may be connected to the RF transceiver module 110 and configured to transmit the second diversity reception signal. After receiving a signal, the first antenna 310 may be configured to transmit a received signal to the second terminal of the first triplexer 210. The first triplexer 210 may be configured to choose different sub-terminals based on types of received signals to output the received signals. For example, in response to the received signal being the first main reception signal, the received signal may be transmitted to the second sub-terminal, and finally output to the RF transceiver module 110. In response to the received signal being the second diversity reception signal, the received signal may be transmitted to the third sub-terminal, and finally output to the RF transceiver module 110.

Figure 3:
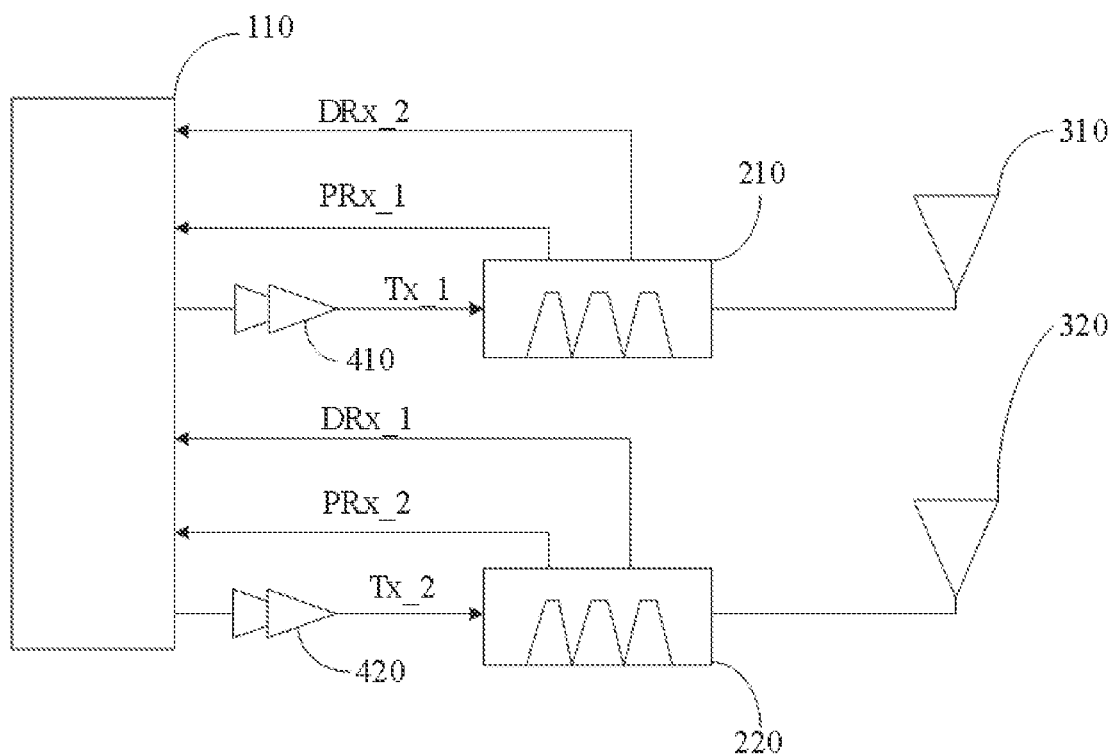
FIG. 3 is a schematic view of a third type of RF module provided by an exemplary embodiment of the present disclosure.

As shown in FIG. 3, in the present embodiments, the RF module further includes a first amplifier circuit 410. A first terminal of the first amplifier circuit 410 is connected to the RF transceiver module 110. A second terminal of the first amplifier circuit 410 is connected to the first sub-terminal of the first triplexer 210. The first amplifier circuit 410 is configured to amplify the first transmission signal. The first amplifier circuit 410 may include a power amplifier.

In some embodiments, the first terminal of the second triplexer 220 includes a first sub-terminal, a second sub-terminal, and a third sub-terminal. The first sub-terminal may be connected to the RF transceiver module 110 and configured to transmit the second transmission signal. The second sub-terminal may be connected to the RF transceiver module 110 and configured to transmit the second main reception signal. The third sub-terminal may be connected to the RF transceiver module 110 and configured to transmit the first diversity reception signal. After receiving the signal, the second antenna 320 may be configured to transmit the received signal to the second terminal of the second triplexer 220. The second triplexer 220 may be configured to choose different sub-terminals based on the types of the received signals to output the received signals. For example, in response to the received signal being the second main reception signal, the received signal may be transmitted to the second sub-terminal, and finally output to the RF transceiver module 110. In response to the received signal being the first diversity reception signal, the received signal may be transmitted to the third sub-terminal, and finally output to the RF transceiver module 110.

In the present embodiments, the RF module further includes a second amplifier circuit 420. A first terminal of the second amplifier circuit 420 is connected to the RF transceiver module 110. A second terminal of the second amplifier circuit 420 is connected to the first sub-terminal of the second triplexer 220. The second amplifier circuit 420 is configured to amplify the second transmission signal. The second amplifier circuit 420 may include the power amplifier.

The RF transceiver module 110 may include a first transmission unit, a second transmission unit, a first main reception unit, a second main reception unit, a first diversity reception unit, and a second diversity reception unit. The first transmission unit is connected to the first amplifier circuit 410 and configured to output the first transmission signal. The second transmission unit is connected to the second amplifier circuit 420 and configured to output the second transmission signal. The first main reception unit is connected to the second sub-terminal of the first triplexer 210 and configured to receive the first main reception signal. The second main reception unit is connected to the second sub-terminal of the second triplexer 220 and configured to receive the second main reception signal. The first diversity reception unit is connected to the third sub-terminal of the second triplexer 220 and configured to receive the first diversity reception signal. The second diversity reception unit is connected to the third sub-terminal of the first triplexer 210 and configured to receive the second diversity reception signal.

Further, the RF module may include multiple third amplifier circuits 430. A corresponding one of the third amplifier circuits 430 is arranged between the second sub-terminal of the first triplexer 210 and the RF transceiver module 110, between the third sub-terminal of the first triplexer 210 and the RF transceiver module 110, between the second sub-terminal of the second triplexer 220 and the RF transceiver module 110, and between the third sub-terminal of the second triplexer 220 and the RF transceiver module 110.

Figure 4:
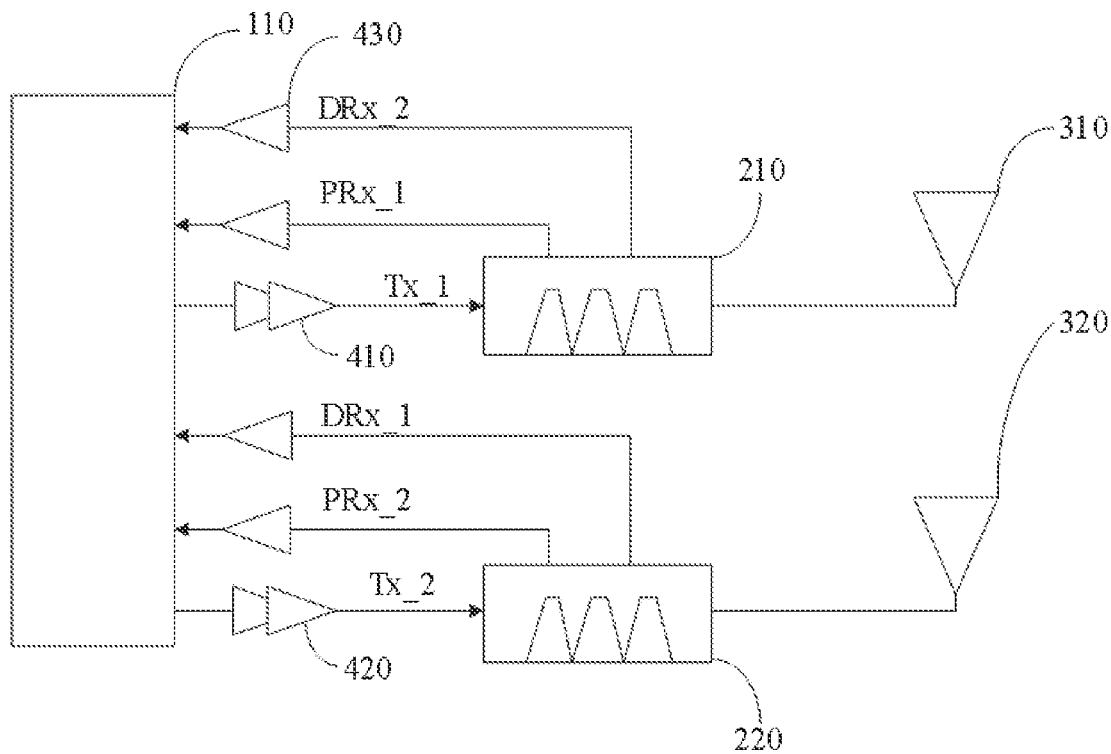
FIG. 4 is a schematic view of a fourth type of RF module provided by an exemplary embodiment of the present disclosure.

As shown in FIG. 4, one third amplifier circuit 430 is connected to the second sub-terminal of the first triplexer 210 and the first main reception unit, and configured to amplify the first main reception signal. Another third amplifier circuit 430 is connected to the third sub-terminal of the first triplexer 210 and the second diversity reception unit, and configured to amplify the second diversity reception signal. A yet third amplifier circuit 430 is connected to the second sub-terminal of the second triplexer 220 and the second main reception unit, and configured to amplify the second main reception signal. A yet third amplifier circuit 430 is connected to the third sub-terminal of the second triplexer 220 and the first diversity reception unit, and configured to amplify the first diversity reception signal.

In some embodiments, the RF transceiver module 110 may be a RF transceiver, the third amplifier circuit 430 may be arranged in the RF transceiver module 110 or outside the RF transceiver module 110. When the third amplifying circuit 430 is arranged outside the RF transceiver module 110, the third amplifying circuit 430 may be a low-noise amplifier (LNA).

Figure 5:
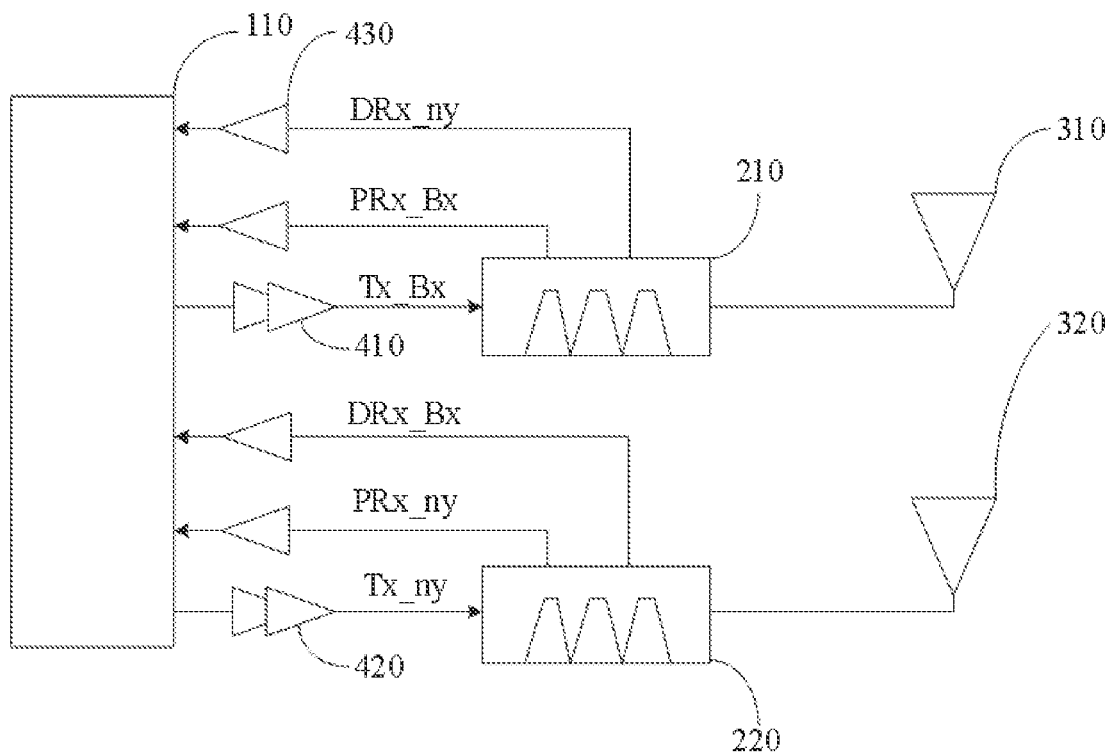
FIG. 5 is a schematic view of a fifth type of RF module provided by an exemplary embodiment of the present disclosure.

In an embodiment, as shown in FIG. 5, the first transmission signal (Tx_Bx) may be a 4G LTE (Long Term Evolution) low-frequency signal, and the second transmission signal (Tx_ny) may be a 5G NR (5G new radio) low-frequency signal. Correspondingly, the first main reception signal (PRx_Bx) and the first diversity reception signal (DRx_Bx) may be LTE low-frequency signals. The second main reception signal (PRx_ny) and the second diversity reception signal (DRx_ny) may be 5G NR low-frequency signals.

Figure 6:
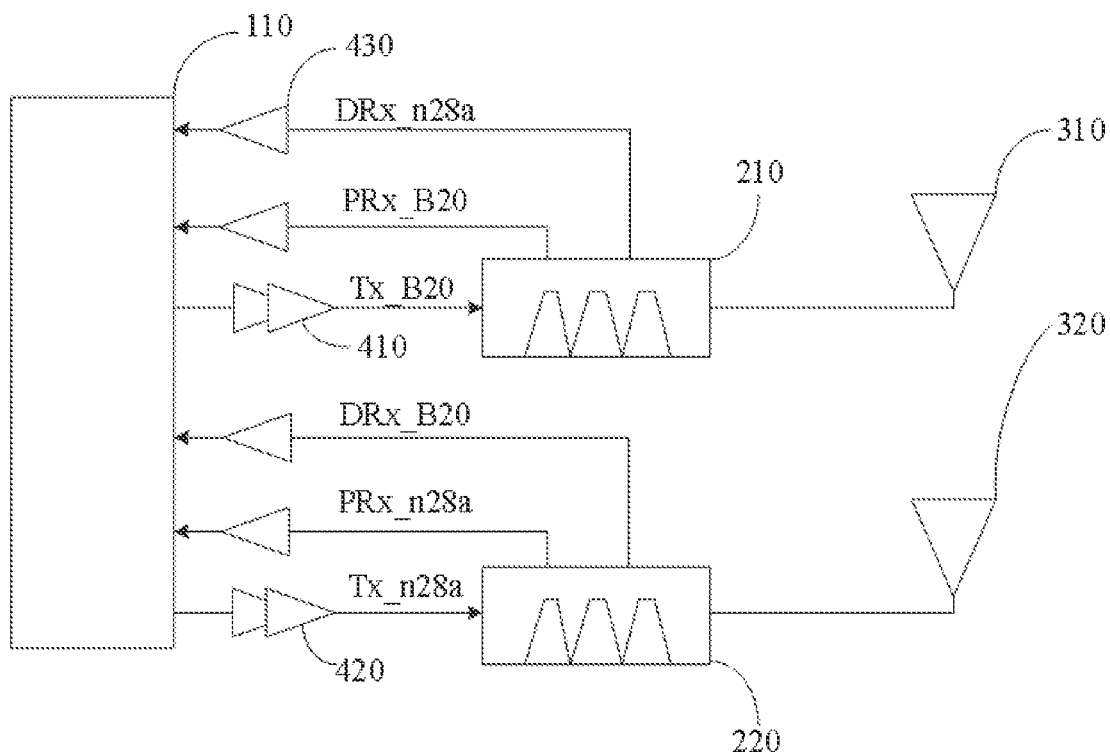
FIG. 6 is a schematic view of a sixth type of RF module provided by an exemplary embodiment of the present disclosure.

In some embodiments, as shown in FIG. 6, a frequency band of the first transmission signal, a frequency band of the first main reception signal, and a frequency band of the first diversity reception signal are B20 respectively. A frequency band of the second transmission signal, a frequency band of the second main reception signal, and a frequency band of the second diversity reception signal are n28a respectively.

In some embodiments, an uplink frequency of a B20 frequency band is 832 MHz-862 MHz, and a downlink frequency of the B20 frequency band is 791 MHz-821 MHz. That is, a frequency of the first transmission signal is 832 MHz-862 MHz, and a frequency of the first main reception signal and a frequency of the first diversity reception signal are 791 MHz-821 MHz. An uplink frequency of an n28a frequency band is 703 MHz-733 MHz, and a downlink frequency of the n28a frequency band is 758 MHz-788 MHz. That is, a frequency of the second transmission signal is 703 MHz-733 MHz, and a frequency of the second main reception signal and a frequency of the second diversity reception signal are 758 MHz-788 MHz.

In other embodiments, the frequency band of the first transmission signal, the frequency band of the first main reception signal, and the frequency band of the first diversity reception signal are B28a respectively. The frequency band of the second transmission signal, the frequency band of the second main reception signal, and the frequency band of the second diversity reception signal are n20 respectively.

In some embodiments, an uplink frequency of a B28a frequency band is 703 MHz-733 MHz, and a downlink frequency of the B28a frequency band is 758 MHz-788 MHz. That is, the frequency of the first transmission signal is 703 MHz-733 MHz, and the frequency of the first main reception signal and the frequency of the first diversity reception signal are 758 MHz-788 MHz. An uplink frequency of an n20 frequency band is 832 MHz-862 MHz, and a downlink frequency of the n20 frequency band is 791 MHz-821 MHz. That is, the frequency of the second transmission signal is 832 MHz-862 MHz, and the frequency of the second main reception signal and the frequency of the second diversity reception signal are 791 MHz-821 MHz.

Figure 7:
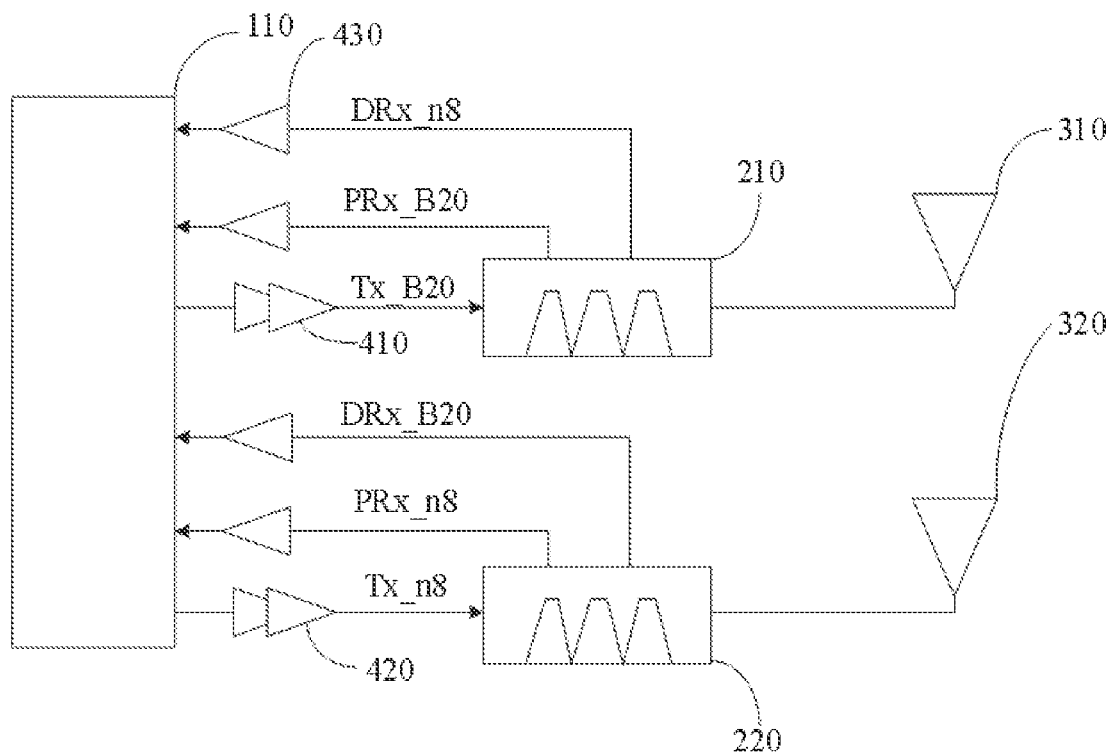
FIG. 7 is a schematic view of a seventh type of RF module provided by an exemplary embodiment of the present disclosure.

In other embodiments, as shown in FIG. 7, the frequency band of the first main reception signal, and the frequency band of the first diversity reception signal are B20 respectively. The frequency band of the second transmission signal, the frequency band of the second main reception signal, and the frequency band of the second diversity reception signal are n8 respectively.

In some embodiments, the uplink frequency of the B20 frequency band is 832 MHz-862 MHz, and the downlink frequency of the B20 frequency band is 791 MHz-821 MHz. That is, the frequency of the first transmission signal is 832 MHz-862 MHz, and the frequency of the first main reception signal and the frequency of the first diversity reception signal are 791 MHz-821 MHz. An uplink frequency of an n8 frequency band is 880 MHz-915 MHz, and a downlink frequency of the n8 frequency band is 925 MHz-960 MHz. That is, the frequency of the second transmission signal is 880 MHz-915 MHz, and the frequency of the second main reception signal and the frequency of the second diversity reception signal are 925 MHz-960 MHz.

In other embodiments, the frequency band of the first transmission signal, the frequency band of the first main reception signal, and the frequency band of the first diversity reception signal are B8 respectively. The frequency band of the second transmission signal, the frequency band of the second main reception signal, and the frequency band of the second diversity reception signal are n20 respectively.

In some embodiments, an uplink frequency of a B8 frequency band is 880 MHz-915 MHz, and a downlink frequency of the B8 frequency band is 925 MHz-960 MHz. That is, the frequency of the first transmission signal is 880 MHz-915 MHz, and the frequency of the first main reception signal and the frequency of the first diversity reception signal are 925 MHz-960 MHz. The uplink frequency of the n20 frequency band is 832 MHz-862 MHz, and the downlink frequency of the n20 frequency band is 791 MHz-821 MHz. That is, the frequency of the second transmission signal is 832 MHz-862 MHz, and the frequency of the second main reception signal and the frequency of the second diversity reception signal are 791 MHz-821 MHz.

Of course, in actual applications, the frequency band of the first transmission signal, the frequency band of the first main reception signal, and the frequency band of the first diversity reception signal may be Bx respectively. The frequency band of the second transmission signal, the frequency band of the second main reception signal, and the frequency band of the second diversity reception signal may be other frequency bands ny respectively. No specific limitations are made in the embodiments of the present disclosure.

A solution of two antennas are provided in the present disclosure to fully decouple two frequency-band antennas of a combination of a FDD low frequency and a low frequency EN-DC (E-UTRA and New radio Dual Connectivity, a dual connection of 4G wireless access network and 5G NR), which may achieve a lower cost. In this way, after low frequency bands are disassembled, an occurrence of a problem that a low frequency on the mobile phone is difficult to achieve a wide frequency band may be reduced.

Figure 8:
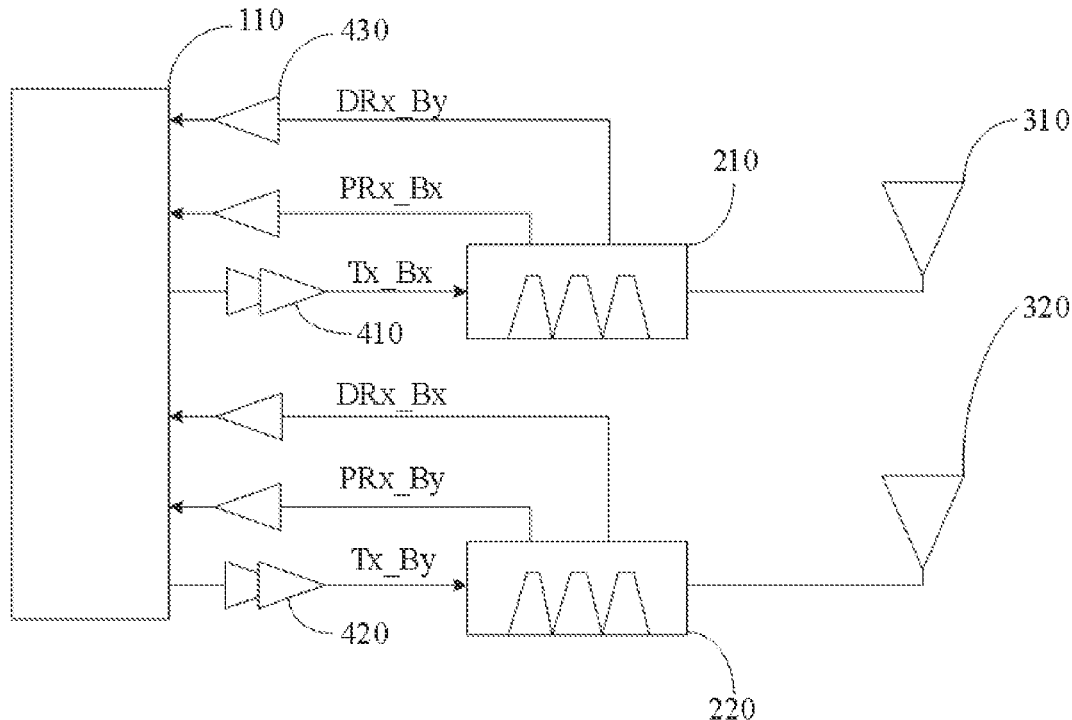
FIG. 8 is a schematic view of an eighth type of RF module provided by an exemplary embodiment of the present disclosure.

In some embodiments, as shown in FIG. 8, the first transmission signal (Tx_Bx) may be a LTE low-frequency signal, and the second transmission signal (Tx_By) may be a LTE low-frequency signal. Correspondingly, the first main reception signal (PRx_Bx) and the first diversity reception signal (DRx_Bx) may be LTE low-frequency signals. The second main reception signal (PRx_By) and the second diversity reception signal (DRx_By) may be the LTE low-frequency signals.

In some embodiments, the frequency band of the first transmission signal, the frequency band of the first main reception signal, and the frequency band of the first diversity reception signal are B20 respectively. The frequency band of the second transmission signal, the frequency band of the second main reception signal, and the frequency band of the second diversity reception signal are B28a respectively.

In some embodiments, the uplink frequency of the B20 frequency band is 832 MHz-862 MHz, and the downlink frequency of the B20 frequency band is 791 MHz-821 MHz. That is, the frequency of the first transmission signal is 832 MHz-862 MHz, and the frequency of the first main reception signal and the frequency of the first diversity reception signal are 791 MHz-821 MHz. The uplink frequency of the B28a frequency band is 703 MHz-733 MHz, the downlink frequency of the B28a frequency band is 758 MHz-788 MHz. That is, the frequency of the second transmission signal is 703 MHz-733 MHz, and the frequency of the second main reception signal and the frequency of the second diversity reception signal are 758 MHz-788 MHz.

In other embodiments, the frequency band of the first transmission signal, the frequency band of the first main reception signal, and the frequency band of the first diversity reception signal are B20 respectively. The frequency band of the second transmission signal, the frequency band of the second main reception signal, and the frequency band of the second diversity reception signal are B8 respectively.

In some embodiments, the uplink frequency of the B20 frequency band is 832 MHz-862 MHz, and the downlink frequency of the B20 frequency band is 791 MHz-821 MHz. That is, the frequency of the first transmission signal is 832 MHz-862 MHz, and the frequency of the first main reception signal and the frequency of the first diversity reception signal are 791 MHz-821 MHz. The uplink frequency of the B8 frequency band is 880 MHz-915 MHz, and the downlink frequency of the B8 frequency band is 925 MHz-960 MHz. That is, the frequency of the second transmission signal is 880 MHz-915 MHz, and the frequency of the second main reception signal and the frequency of the second diversity reception signal are 925 MHz-960 MHz.

Of course, in the actual applications, the frequency band of the first transmission signal, the frequency band of the first main reception signal, and the frequency band of the first diversity reception signal may be other frequency bands Bx respectively. The frequency band of the second transmission signal, the frequency band of the second main reception signal, and the frequency band of the second diversity reception signal may be the other frequency bands By respectively. No specific limitations are made in the embodiments of the present disclosure.

Figure 9:
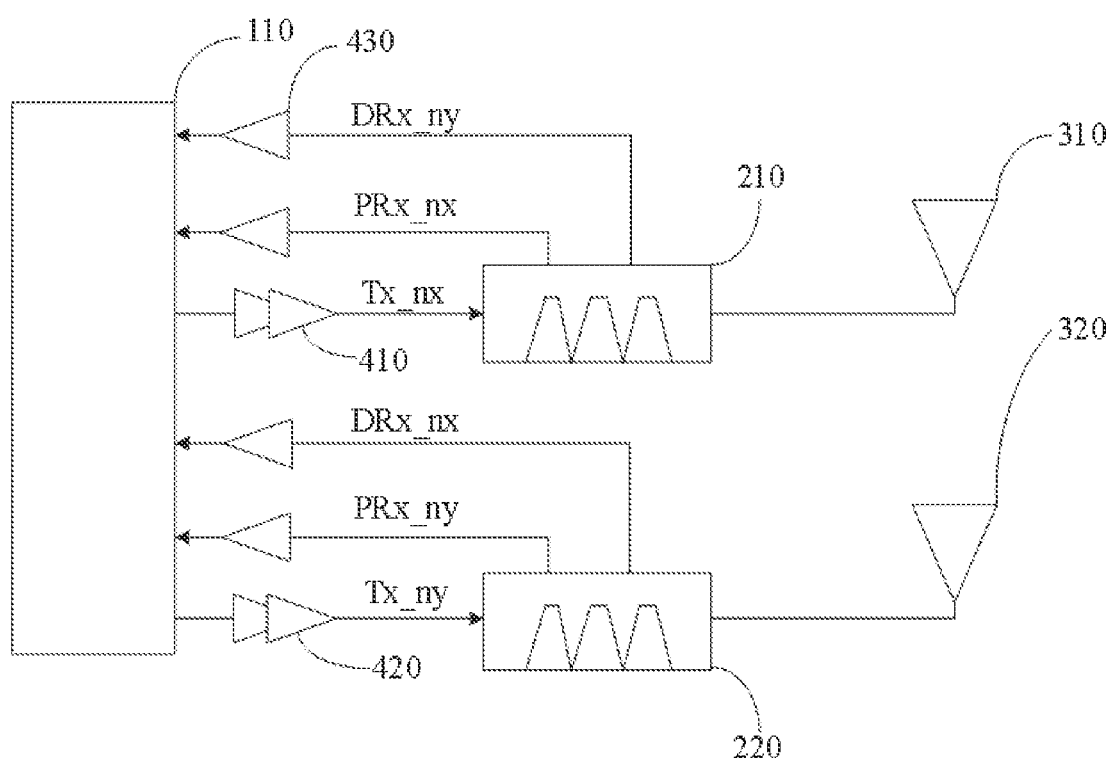
FIG. 9 is a schematic view of a ninth type of RF module provided by an exemplary embodiment of the present disclosure.

In an embodiment, as shown in FIG. 9, the first transmission signal (Tx_nx) may be a 5G NR low-frequency signal, and the second transmission signal (Tx_ny) may be the 5G NR low-frequency signal. Correspondingly, the first main reception signal (PRx_nx) and the first diversity reception signal (DRx_nx) may be 5G NR low-frequency signals. The second main reception signal (PRx_ny) and the second diversity reception signal (DRx_ny) may be the 5G NR low-frequency signals.

In some embodiments, the frequency band of the first transmission signal, the frequency band of the first main reception signal, and the frequency band of the first diversity reception signal are n20 respectively. The frequency band of the second transmission signal, the frequency band of the second main reception signal, and the frequency band of the second diversity reception signal are n28a respectively.

In some embodiments, the uplink frequency of the n20 frequency band is 832 MHz-862 MHz, and the downlink frequency of the n20 frequency band is 791 MHz-821 MHz. That is, the frequency of the first transmission signal is 832 MHz-862 MHz, and the frequency of the first main reception signal and the frequency of the first diversity reception signal are 791 MHz-821 MHz. The uplink frequency of the n28a frequency band is 703 MHz-733 MHz, and the downlink frequency of the n28a frequency band is 758 MHz-788 MHz. That is, the frequency of the second transmission signal is 703 MHz-733 MHz, and the frequency of the second main reception signal and the frequency of the second diversity reception signal are 758 MHz-788 MHz.

In other embodiments, the frequency band of the first transmission signal, the frequency band of the first main reception signal, and the frequency band of the first diversity reception signal are n20 respectively. The frequency band of the second transmission signal, the frequency band of the second main reception signal, and the frequency band of the second diversity reception signal are n8 respectively.

In some embodiments, the uplink frequency of the n20 frequency band is 832 MHz-862 MHz, and the downlink frequency of the n20 frequency band is 791 MHz-821 MHz. That is, the frequency of the first transmission signal is 832 MHz-862 MHz, and the frequency of the first main reception signal and the frequency of the first diversity reception signal are 791 MHz-821 MHz. The uplink frequency of the n8 frequency band is 880 MHz-915 MHz, and the downlink frequency of the n8 frequency band is 925 MHz-960 MHz. That is, the frequency of the second transmission signal is 880 MHz-915 MHz, and the frequency of the second main reception signal and the frequency of the second diversity reception signal are 925 MHz-960 MHz.

Of course, in the actual applications, the frequency band of the first transmission signal, the frequency band of the first main reception signal, and the frequency band of the first diversity reception signal may be other frequency bands nx respectively. The frequency band of the second transmission signal, the frequency band of the second main reception signal, and the frequency band of the second diversity reception signal may be the other frequency bands ny respectively. No specific limitations are made in the embodiments of the present disclosure.

According to the RF module provided in some embodiments of the present disclosure, the first antenna 310 is configured to transmit the first transmission signal, receive the first main reception signal, and receive the second diversity reception signal; and the second antenna 320 is configured to transmit the second transmission signal, receive the second main reception signal, and receive the first diversity reception signal. In this way, the occurrence of the additional antenna required to be arranged separately for receiving the first diversity reception signal and the second diversity reception signal may be reduced. The number of the antennas may be reduced, such that the problem of the difficulty of arranging the antennas in the electronic devices resulting from more antennas in the electronic devices may be solved at least to a certain extent. As a result, the spaces of the electronic devices may be saved effectively. In addition, the number of the RF channels may be reduced by virtue of adopting the triplexers, such that the space of the motherboard may be saved.

An electronic device is further provided in some embodiments of the present disclosure and includes the RF module described above.

Figure 10:
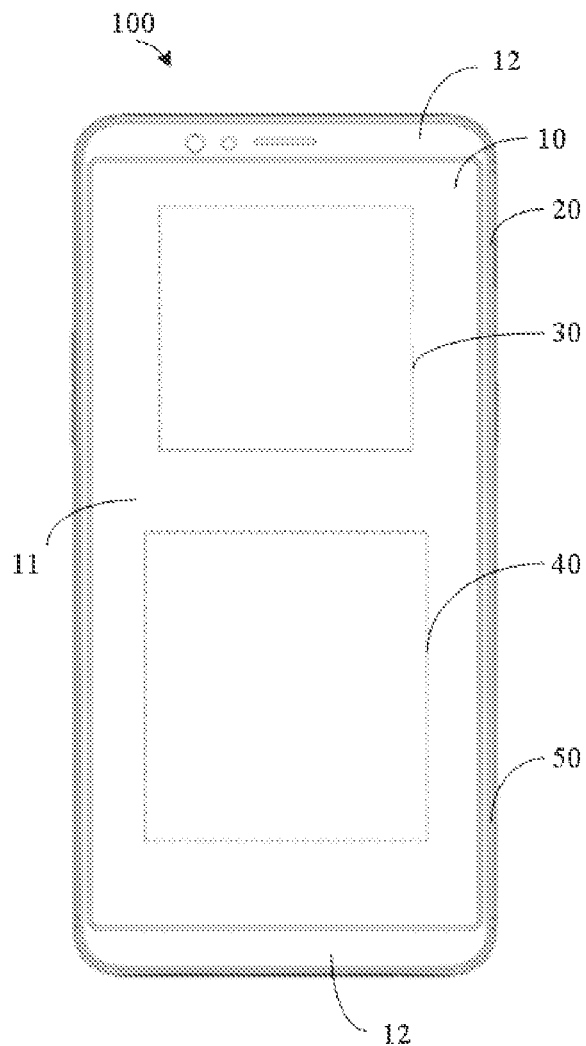
FIG. 10 is a schematic view of an electronic device provided by an exemplary embodiment of the present disclosure.

As shown in FIG. 10, the electronic device 100 may further include a display screen 10, a frame 20, a motherboard 30, a battery 40 and a rear cover 50. In some embodiments, the display screen 10 is installed in the frame 20 to assemble a display surface of the electronic device 100. The display screen 10 may serve as a front housing of the electronic device 100. The rear cover 50 is pasted on the frame 20 by a double-sided tape. An accommodation space is defined by the display screen 10, the frame 20, and the rear cover 50 to accommodate other electronic components or functional modules of the electronic device 100. In addition, the display surface formed by the display screen 10 is configured to display information such as images and texts. The display screen 10 may be a liquid crystal display (LCD) or an organic light-emitting diode (OLED) type display screen, and the like.

A glass cover plate may be arranged on the display screen 10. The glass cover plate may cover the display screen 10 to protect the display screen 10 and reduce a possibility of the display screen 10 being scratched or damaged by water.

The display screen 10 may include a display area 11 and a non-display area 12. The display area 11 is configured to perform a display function of the display screen 10 for displaying the information such as the images and the texts. The non-display area 12 is configured not to display information and to be arranged with a functional module such as a camera, a receiver, and a proximity sensor. In some embodiments, the non-display area 12 may include at least one area located at an upper portion or a lower portion of the display area 11.

The display screen 10 may be a full screen. In this case, the display screen 10 may display the information in the full screen, such that the electronic device 100 may have a larger screen ratio. The display screen 10 includes only the display area 11 rather than the non-display area 12. In this case, the functional module such as the camera and the proximity sensor in the electronic device 100 may be hidden under the display screen 10, and a fingerprint recognition module of the electronic device 100 may be arranged on a rear surface of the electronic device 100.

The frame 20 may be a hollow frame structure. A material of the frame 20 may include a metal or a plastic. The frame 20 may include a first metal branch and a second metal branch. The first metal branch is as a radiator of the first antenna, and the second metal branch is as a radiator of the second antenna. The motherboard 30 is installed inside the accommodation space described above. For example, the motherboard 30 may be installed on the frame 20 and accommodated in the accommodation space with the frame 20. A ground point is arranged on the motherboard 30 to achieve a grounding of the motherboard 30. The motherboard 30 may be integrated with one or more the functional module such as a motor, a microphone, a speaker, a receiver, a headphone interface, a universal serial bus interface (a USB interface), the camera, the proximity sensor, an ambient light sensor, a gyroscope, and a processor. In addition, the display screen 10 may be electrically connected to the motherboard 30.

A display-controlling circuit may be arranged on the motherboard 30 and configured to output an electrical signal for controlling the display screen 10 to display the information.

The battery 40 is installed inside the accommodation space. For example, the battery 40 may be mounted on the frame 20 and accommodated in the accommodation space with the frame 20. The battery 40 may be electrically connected to the motherboard 30 for supplying power to the electronic device 100. In some embodiments, a power management circuit may be arranged on the motherboard 30 and configured to distribute a voltage supplied by the battery 40 to each of electronic components in the electronic device 100.

The rear cover 50 is configured to define an outer contour of the electronic device 100. The rear cover 50 may be integrally formed. During a process of forming the rear cover 50, a structure such as a rear camera hole, a mounting hole for the fingerprint identification module, and the like, may be defined in the rear cover 50.

The RF transceiver module 110, the first triplexer 210, the second triplexer 220, the first amplifier circuit 410, the second amplifier circuit 420, the third amplifier circuit 430, and other components in the RF module may be arranged on the motherboard 30. A grounding portion may also be arranged on the motherboard 30. The first antenna 310 and the second antenna 320 may be connected to the grounding portion.

The first antenna 310 and the second antenna 320 may be arranged on the motherboard 30, or the frame 20, or the rear cover 50. When the antennas are arranged on the frame 20, the frame 20 may be a metal frame. The metal frame may be separated to multiple sections by insulators. When the antennas are arranged on the rear cover 50, the rear cover may be a metal rear cover and separated to multiple sections.

The first antenna 310 and the second antenna 320 may be dedicated antennas for low-frequency signals or antennas shared by the low-frequency signals and high-frequency signals. When the first antenna 310 and the second antenna 320 are the antennas shared by the low-frequency signals and high-frequency signals, a switching circuit may also be arranged on the motherboard 30 for switching the antennas to connect RF modules with different frequencies.

According to the electronic device provided in some embodiments of the present disclosure, the first antenna 310 is configured to transmit the first transmission signal, receive the first main reception signal, and receive the second diversity reception signal; and the second antenna 320 is configured to transmit the second transmission signal, receive the second main reception signal, and receive the first diversity reception signal. In this way, the occurrence of the additional antenna required to be arranged separately for receiving the first diversity reception signal and the second diversity reception signal may be reduced. The number of the antennas may be reduced, such that the problem of the difficulty of arranging the antennas in the electronic devices resulting from more antennas in the electronic devices may be solved at least to a certain extent. As a result, the spaces of the electronic devices may be saved effectively. In addition, the number of the RF channels may be reduced by virtue of adopting the triplexers, such that the space of the motherboard may be saved.

After considering the specification and implementing solutions of the present disclosure, it is readily for those skilled in the art to obtain other embodiments of the present disclosure. The present disclosure is intended to cover any variations, applications, or adaptive changes of the present disclosure which follow general principles of the present disclosure and include common knowledge or techniques in the art not disclosed by the present disclosure. The specification and embodiments are only regarded to be exemplary. A true scope and a spirit of the present disclosure are indicated by the appended claims.

What is claimed is:

1. A radio frequency (RF) module, comprising:
    a RF transceiver module, configured to transmit and receive RF signals;
    a first antenna, configured to transmit a first transmission signal, receive a first main reception signal, and receive a second diversity reception signal;
    a first triplexer, comprising a first terminal connected to the RF transceiver module, and a second terminal connected to the first antenna, wherein the first triplexer is configured to isolate the first transmission signal, the first main reception signal, and the second diversity reception signal;
    a second antenna, configured to transmit a second transmission signal, receive a second main reception signal, and receive a first diversity reception signal; wherein a frequency band of the first transmission signal is different from a frequency band of the second transmission signal; and
    a second triplexer, comprising a first terminal connected to the RF transceiver module, and a second terminal connected to the second antenna, wherein the second triplexer is configured to isolate the second transmission signal, the second main reception signal, and the first diversity reception signal,
    wherein a frequency band of the first transmission signal, a frequency band of the first main reception signal, and a frequency band of the first diversity reception signal are 4G frequency bands, and
    wherein a frequency band of the second transmission signal, a frequency band of the second main reception signal, and a frequency band of the second diversity reception signal are 5G frequency bands.

2. The RF module according to claim 1, wherein the first terminal of the first triplexer comprises:
    a first sub-terminal, connected to the RF transceiver module and configured to transmit the first transmission signal;
    a second sub-terminal, connected to the RF transceiver module and configured to transmit the first main reception signal; and
    a third sub-terminal, connected to the RF transceiver module and configured to transmit the second diversity reception signal.

3. The RF module according to claim 2, wherein the RF module further comprises:
    a first amplifier circuit, comprising a first terminal connected to the RF transceiver module, and a second terminal connected to the first sub-terminal of the first triplexer, wherein the first amplifier circuit is configured to amplify the first transmission signal.

4. The RF module according to claim 2, wherein the first terminal of the second triplexer comprises:
    a first sub-terminal, connected to the RF transceiver module and configured to transmit the second transmission signal;
    a second sub-terminal, connected to the RF transceiver module and configured to transmit the second main reception signal; and
    a third sub-terminal, connected to the RF transceiver module and configured to transmit the first diversity reception signal.

5. The RF module according to claim 4, wherein the RF module further comprises:
    a second amplifier circuit, comprising a first terminal connected to the RF transceiver module, and a second terminal connected to the first sub-terminal of the second triplexer, wherein the second amplifier circuit is configured to amplify the second transmission signal.

6. The RF module according to claim 4, further comprising:
    third amplifier circuits, wherein a corresponding one of the third amplifier circuits is arranged between the second sub-terminal of the first triplexer and the RF transceiver module, between the third sub-terminal of the first triplexer and the RF transceiver module, between the second sub-terminal of the second triplexer and the RF transceiver module, and between the third sub-terminal of the second triplexer and the RF transceiver module.

7. The RF module according to claim 1, wherein the frequency band of the first transmission signal, the frequency band of the first main reception signal, and the frequency band of the first diversity reception signal are B20 respectively; and the frequency band of the second transmission signal, the frequency band of the second main reception signal, and the frequency band of the second diversity reception signal are n8 respectively.

8. The RF module according to claim 1, wherein the frequency band of the first transmission signal, the frequency band of the first main reception signal, and the frequency band of the first diversity reception signal are B8 respectively; and the frequency band of the second transmission signal, the frequency band of the second main reception signal, and the frequency band of the second diversity reception signal are n20 respectively.

9. The RF module according to claim 1, wherein the frequency band of the first transmission signal, the frequency band of the first main reception signal, and the frequency band of the first diversity reception signal are B20 respectively; and the frequency band of the second transmission signal, the frequency band of the second main reception signal, and the frequency band of the second diversity reception signal are n28a respectively.

10. The RF module according to claim 1, wherein the frequency band of the first transmission signal, the frequency band of the first main reception signal, and the frequency band of the first diversity reception signal are B28a respectively; and the frequency band of the second transmission signal, the frequency band of the second main reception signal, and the frequency band of the second diversity reception signal are n20 respectively.

11. An electronic device, wherein the electronic device comprises a RF module, and the RF module comprises:
    a RF transceiver module, configured to transmit and receive RF signals;

a first antenna, configured to transmit a first transmission signal, receive a first main reception signal, and receive a second diversity reception signal;

a first triplexer, comprising a first terminal connected to the RF transceiver module, and a second terminal connected to the first antenna, wherein the first triplexer is configured to isolate the first transmission signal, the first main reception signal, and the second diversity reception signal;

a second antenna, configured to transmit a second transmission signal, receive a second main reception signal, and receive a first diversity reception signal; wherein a frequency band of the first transmission signal is different from a frequency band of the second transmission signal; and a second triplexer, comprising a first terminal connected to the RF transceiver module, and a second terminal connected to the second antenna, wherein the second triplexer is configured to isolate the second transmission signal, the second main reception signal, and the first diversity reception signal, wherein a frequency band of the first transmission signal, a frequency band of the first main reception signal, a frequency band of the first diversity reception signal, a frequency band of the second transmission signal, a frequency band of the second main reception signal, and a frequency band of the second diversity reception signal are 5G frequency bands.

12. The electronic device according to claim 11, further comprising:

a motherboard, wherein the first triplexer and the second triplexer are arranged on the motherboard.

13. The electronic device according to claim 11, further comprising: a frame, comprising:

a first metal branch; and a second metal branch;

wherein the first metal branch is as a radiator of the first antenna, and the second metal branch is as a radiator of the second antenna.

\* \* \* \* \*